(12) United States Patent
Lallier

(10) Patent No.: US 7,662,303 B2
(45) Date of Patent: Feb. 16, 2010

(54) PERFLUOROBUTYL ETHER-BASED COMPOSITION

(75) Inventor: Jean-Pierre Lallier, Saint Bonnet De Mure (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 11/972,270

(22) Filed: Jan. 10, 2008

(65) Prior Publication Data

US 2009/0181876 A1      Jul. 16, 2009

(51) Int. Cl.
*C09K 5/04*      (2006.01)
(52) U.S. Cl. .......................... 252/67; 510/176; 510/204
(58) Field of Classification Search .................. 252/67, 252/68; 510/176, 204
See application file for complete search history.

(56) References Cited

U.S. PATENT DOCUMENTS

2004/0143028 A1*   7/2004   Takano et al. ............... 521/155
2005/0043422 A1*   2/2005   Shibanuma et al. ......... 521/155

FOREIGN PATENT DOCUMENTS

EP        700953   A2  *   3/1996

* cited by examiner

*Primary Examiner*—John R Hardee
(74) *Attorney, Agent, or Firm*—Steven D. Boyd

(57) ABSTRACT

The present invention relates to perfluorobutyl ether mixtures or compositions that are azeotropic or of azeotropic type. More particularly, one subject of the invention is compositions comprising at least one nonafluorobutyl alkyl ether and a biodegradable compound, capable of being used as a solvent or refrigerant.

7 Claims, No Drawings

PERFLUOROBUTYL ETHER-BASED COMPOSITION

FIELD OF THE INVENTION

The present invention relates to perfluorobutyl ether mixtures or compositions that are azeotropic or of azeotropic type. More particularly, one subject of the invention is compositions comprising at least one nonafluorobutyl alkyl ether and a biodegradable compound.

BACKGROUND OF THE INVENTION

The Earth's atmosphere blocks IR emissions coming from the Earth, which is the cause of a greenhouse effect and of a moderate temperature, favourable to life. In the atmosphere, it is mainly carbon dioxide $CO_2$ that is responsible for this natural greenhouse effect. The emission, by man, of certain gases (including $CO_2$ from fossil fuels) amplifies this effect, causing global warming with its consequences on the climate: storms, floods, variation of pack ice surface area and glacier recession.

The Kyoto protocol (1997) aims to reduce the emission of 6 greenhouse gases ($CO_2$, $CH_4$, $N_2O$, HFC, PFC, $SF_6$) in the commitment period 2008-2012, by 5% globally relative to 1990 (reference year).

The greenhouse effect of a given product is quantified by its GWP (Global Warming Potential) which takes into account the intrinsic effect of radiation absorption by the molecule but also the lifetime of the molecule in the atmosphere (or what amounts to the same thing as its concentration during a given period of time, usually 1 century). This GWP is given relative to $CO_2$, taken as a reference gas.

Fluorinated solvents have been used for a long time in high-technology industries such as electronics, aeronautics, precision mechanics or the medical sector. In these fields, the objective always remains the same, namely to obtain a surface of very high cleanliness, which is a question of removing greasy soiling which is more or less polar, solid particles, electron flow or water.

In precision cleaning there is often the presence of very complex parts equipped with grooves, ribs or blind holes that the solvent will imperatively have to wet in order to be effective in these difficult places. Fluorinated solvents are from the family of solvents that provide the best possible wetting of a surface, which is expressed by very low surface tensions (18.4 mN/m for HCFC 141b and 13.3 mN/m for HFC 365 mfc versus 32.3 mN/m for perchloroethylene, another non-fluorinated cleaning solvent, for example). Another advantage of a high wetting is obtaining faster drying of substrates.

At practically identical molecular weights, fluorinated solvents have lower boiling points and higher vapour pressures. Thus, HCFC 141b boils at 32° C. whereas chloroform boils at 61° C. These two properties (low boiling point and high vapour pressure) are favourable to the use of these solvents in conventional industrial machines that operate with a vapour phase enabling the rinsing and drying of parts and also the regeneration of the solvent which is continuously distilled. The operating process of these machines, equipped with a heavy-duty system for cooling, by condensation, of the vapours on a coil, minimizes the drawback of the high vapour pressures used. Industrialists desire substitution solutions which can operate in their existing stock of machines.

Furthermore, hydrofluorocarbons are widely used in refrigeration and in heat transfer processes.

DETAILED DESCRIPTION OF THE INVENTION

The present invention provides compositions having a low GWP and which have the advantage of being biodegradable.

The compositions according to the present invention comprise methyltetrahydrofuran and at least one nonafluorobutyl alkyl ether of formula $C_4F_9OR$ with R representing a linear or branched saturated alkyl chain having from 1 to 4 carbon atoms. Advantageously, the compositions comprise 5-40 wt % of methyltetrahydrofuran and 60-95 wt % of nonafluorobutyl alkyl ether of formula $C_4F_9OR$.

The preferred methyltetrahydrofuran is 2-methyltetrahydrofuran.

Among the nonafluorobutyl alkyl ethers of formula $C_4F_9OR$, nonafluorobutyl methyl ether and nonafluorobutyl ethyl ether are preferred.

Regardless of R, the preferred nonafluorobutyl alkyl ether mainly consists of nonafluoro-n-butyl alkyl ether and nonafluoroisobutyl alkyl ether.

Compositions that are azeotropic or of azeotropic type are particularly advantageous.

When R is methyl, the compositions that are azeotropic or of azeotropic type comprise 5-15 wt % of methyltetrahydrofuran and 85-95 wt % of nonafluorobutyl methyl ether. An azeotropic composition comprising 8 wt % of methyltetrahydrofuran and 92 wt % of nonafluorobutyl methyl ether has a boiling point of 59.7° C. at atmospheric pressure.

When R is ethyl, the compositions that are azeotropic or of azeotropic type comprise 10-40 wt % of methyltetrahydrofuran and 60-90 wt % of nonafluorobutyl ethyl ether. An azeotropic composition comprising 24.6 wt % of methyltetrahydrofuran and 75.4 wt % of nonafluorobutyl ethyl ether has a boiling point of 71.6° C. at atmospheric pressure (103.3 kPa).

An azeotropic composition is a liquid mixture of two or more compounds that has a constant boiling point (that is to say no tendency to fractionate during boiling or evaporation) which may be either above or below the boiling points of the respective compounds. Thus, the composition of the vapour formed during the evaporation is identical or practically identical to the initial liquid composition.

A composition of azeotropic type is a liquid mixture of two or more compounds having a substantially constant boiling point, that is to say that it behaves as a single compound. The determination of a compound of azeotropic type may be carried out by evaporation or distillation or by comparing the vapour pressure at the bubble point or dew point at a given temperature.

The use of an azeotrope is particularly advantageous in the case of industrial usage, for regenerating the composition, for example when it is saturated with soiling. A simple distillation makes it possible to recover the initial azeotropic composition without any fractionation of the constituents.

Moreover, 2-methyltetrahydrofuran (2-MeTHF) has the advantage of being derived from renewable raw materials such as furfural obtained from cellulose materials. Thus, hemicellulose polysaccharides are sugar-based polymers containing five carbon atoms. When the hemicellulose is heated in the presence of sulphuric acid, pentoses (sugars containing five carbon atoms) such as xylose are obtained. When the thermal dehydration of xylose is carried out, this xylose is converted to furfural.

Besides the low GWP and their biodegradability, certain compositions according to the present invention are non-flammable (closed cup flash point above 55° C. according to the ASTM D3828 standard) and are most particularly suitable as cleaning solvents or as a refrigerant for heating and cooling applications. They may also be used as blowing agents.

EXPERIMENTAL SECTION

Example 1

The boiling point of the liquid mixture was measured by using an ebullioscopic technique. The ebullioscope was first charged with an amount of nonafluorobutyl methyl ether then brought to boiling. The boiling point at atmospheric pressure was recorded after the equilibrium state was reached. An aliquot of 2-methyltetrahydrofuran was then introduced into the ebullioscope and the temperature was recorded again after having reached the equilibrium state.

Table I gives the boiling point measurements at 103.3 kPa for various mixtures of nonafluorobutyl methyl ether and 2-methyltetrahydrofuran.

TABLE I

| Wt % of nonafluorobutyl methyl ether | Wt % of methyltetrahydrofuran | Boiling point (° C.) at 103.3 kPa |
|---|---|---|
| 100 | 0 | 61 |
| 90 | 10 | 60.7 |
| 80 | 20 | 62.3 |
| 70 | 30 | 64.2 |
| 55 | 45 | 66.6 |
| 45 | 55 | 67.4 |
| 35 | 65 | 68.7 |
| 25 | 75 | 70.4 |
| 0 | 100 | 80 |

Fractional distillation of a liquid mixture containing 50 wt % of nonafluorobutyl methyl ether and 50 wt % of methyltetrahydrofuran revealed an azeotropic composition of 92 wt % of nonafluorobutyl methyl ether and 8 wt % of methyltetrahydrofuran with a boiling point of 59.7° C. at a pressure of 103.3 kPa.

Example 2

The ebullioscopic method was carried out as described in Example 1.

Table II gives the boiling point measurements at 103.3 kPa for various mixtures of nonafluorobutyl ethyl ether and 2-methyltetrahydrofuran.

TABLE II

| Wt % of nonafluorobutyl ethyl ether | Wt % of methyltetrahydrofuran | Boiling point (° C.) at 103.3 kPa |
|---|---|---|
| 100 | 0 | 75.7 |
| 88 | 12 | 72.9 |
| 78 | 22 | 72.2 |
| 70 | 30 | 72.2 |
| 60 | 40 | 72.6 |
| 50 | 50 | 73.1 |
| 40 | 60 | 74 |
| 0 | 100 | 80 |

Fractional distillation of a liquid mixture containing 50 wt % of nonafluorobutyl ethyl ether and 50 wt % of methyltetrahydrofuran revealed an azeotropic composition of 75.4 wt % of nonafluorobutyl ethyl ether and 24.6 wt % of methyltetrahydrofuran with a boiling point of 71.6° C. at a pressure of 103.3 kPa.

General Procedure for the Cleaning Tests

2×5 cm stainless steel sheets were first degreased with FORANE 141b. These sheets were each weighed before the test, which constituted the tare. They were then coated on a single side with the oil REDUCTELF SP 460. The oil-coated sheet was weighed, and the amount of coated oil was deduced from the difference with the tare. Next, the oil-coated sheet was immersed in a beaker containing 100 ml of the composition to be evaluated for 5 min, without stirring and without ultrasounds. Once removed, the sheet was drip dried with ventilation for 15 min and at the end of this time the amount of oil remaining was determined by weighing. In comparison with the initial amount of oil, the percentage of oil removed was calculated.

Example 3

With a composition of nonafluorobutyl methyl ether, a zero percentage of oil removed was obtained.

Example 4

With a composition comprising 8 wt % of 2-MeTHF and 92 wt % of nonafluorobutyl methyl ether, 75 wt % of oil was removed. Simple heating at 45° C., or simple stirring or else the application of ultrasounds at ambient temperature (20° C.) makes it possible to remove all of the deposited oil. Furthermore, the dissolution of the oil was not observed but rather the detachment of the oil which rose to the surface of the liquid (rolling up mechanism). This mechanism is more advantageous than that of solubilization which rapidly leads to saturation of the solvent.

General Procedure for the Oil Dissolution Tests

Silicone oil (Crompton L9000-1000 from Crompton Corporation (Greenwich, USA)) was introduced into 100 ml of the composition to be evaluated and the amount of silicone oil dissolved instantaneously at ambient temperature was determined (it was expressed as % of oil dissolved relative to the mixture).

Example 5

With the azeotropic composition of 75.4 wt % of nonafluorobutyl ethyl ether and 24.6 wt % of methyltetrahydrofuran, more than 17 wt % of oil were dissolved.

Example 6

With nonafluorobutyl ethyl ether, at most 2 wt % of oil were dissolved and demixing was observed.

The invention claimed is:

1. An azeotropic or azeotropic type composition comprising 2-methyltetrahydrofuran and nonafluorobutyl ethyl ether.

2. Compositions according to claim 1, characterized in that they comprise 5-40 wt % of 2-methyltetrahydrofuran and 60-95 wt % of nonafluorobutyl ethyl ether.

3. Compositions according to claim 1, characterized in that the nonafluorobutyl ethyl ether mainly consists of nonafluoro-n-butyl ethyl ether and nonafluoroisobutyl ethyl ether.

4. Compositions according to claim 1, characterized in that said composition comprises 10-40 wt % of 2-methyltetrahydrofuran and 60-90 wt % of nonafluorobutyl ethyl ether.

5. Refrigerant characterized in that it consists essentially a composition according to claim 1.

6. Solvent characterized in that it consists essentially a composition according to claim 1.

7. Azeotropic composition comprising 24.6 wt % of 2-methyltetrahydrofuran and 75.4 wt % of nonafluorobutyl ethyl ether having a boiling point of 71.6° C. at atmospheric pressure (103.3 kPa).

* * * * *